Nov. 14, 1950   R. BŘEŽEK   2,529,994
AIR INLET STRUCTURE FOR REAR ENGINE COMPARTMENTS
OF STREAMLINED VEHICLES
Filed Feb. 27, 1948

Inventor:
Rudolf Břežek,
by Singer, Ehlert, Stern & Carlberg,
Attorneys.

Patented Nov. 14, 1950

2,529,994

UNITED STATES PATENT OFFICE 2,529,994

AIR INLET STRUCTURE FOR REAR ENGINE COMPARTMENTS OF STREAMLINED VEHICLES

Rudolf Březek, Prague-Smichov, Czechoslovakia, assignor to Tatra narodni podnik, Koprivnice, Czechoslovakia Application February 27, 1948, Serial No. 11,783
In Germany October 27, 1942

Section 1, Public Law 690, August 8, 1946
Patent expires October 27, 1962

2 Claims. (Cl. 180—54)

Motor vehicles with rear engine, which arrangement is especially suitable for streamlined vehicles, are often unable to utilize to the full all those advantages which the streamlined shape of the vehicle body is presenting, as the rear engine space suffers from a lack of cooling air so that merely weaker engines may be used therein than would be possible for a car of equal size with the engine arranged in front, where the cooling conditions are substantially better.

Different apertures for leading the air to the engine space and especially various auxiliary collecting surfaces projecting beyond the circumference of the vehicle body deteriorate substantially the efficiency of said vehicle body shape by increasing the rolling resistance thereof.

According to the present invention a substantial improvement of the cooling conditions without deteriorating the body shape is obtained in arranging across the vehicle body surface between the useful body proper and the engine space, a comparatively wide slot whose area takes up a substantial portion of the transverse circumference of the vehicle body and is divided by longitudinal ribs which are fixed, on the one hand, to the wall of the vehicle body proper and, on the other hand, to the wall of the engine space into several approximately equal areas, whereby the ribs serve at the same time as supports for narrow transversely extending ledges made out of plate strips inclined in the direction of the air entrance into said slot and forming a covering grid on said slot.

Thus a large inlet cross section is obtained for directing air into the engine space, without deteriorating the appearance of the vehicle or a smooth course of the streamlines around the vehicle body.

Figure 1:
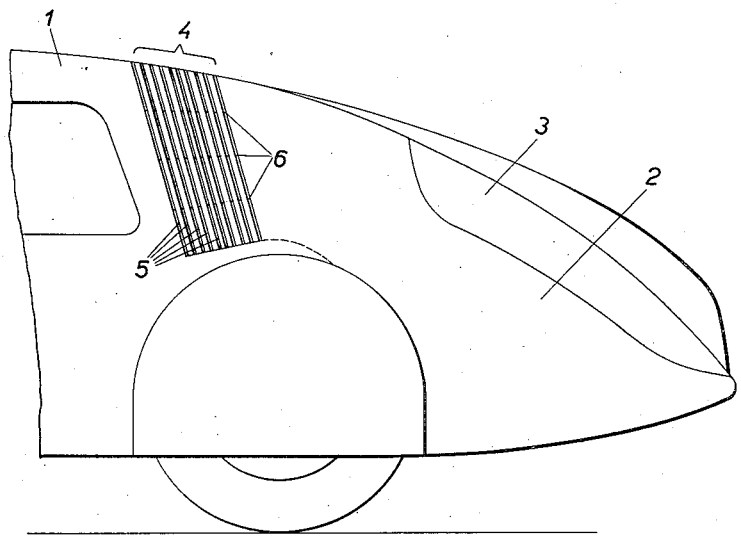
Figure 2:
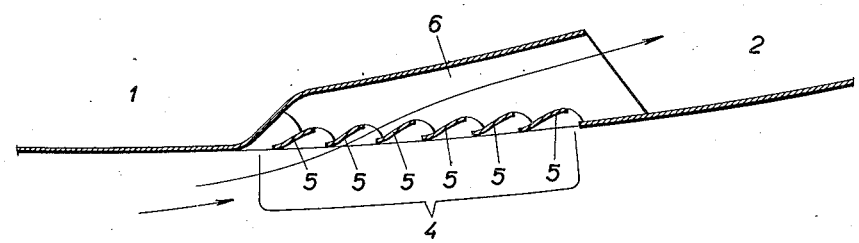

The accompanying drawing shows, merely by way of example, diagrammatically an embodiment of the present invention, Fig. 1 showing a side view of the respective vehicle portion, Fig. 2 a sectional view of the slot on an enlarged scale.

Between the useful vehicle 1 proper and the engine space 2 covered by a hood 3, a wide slot 4 is provided in the body wall which covers the engine space in front of the hood 3 enabling air to a substantial extent to penetrate into the engine space 2. Said slot 4 extends transversely of the body and terminates with both its ends in the side walls of the streamlined body just above the mudguards for the rear wheels. The slot 4 is outwardly covered by a grid consisting of plate ledges 5 extending parallel to each other along the whole length of the slot and fixed on longitudinal ribs 6 interposed between the body walls and the engine space. The ledges 5 are, as can be seen in Fig. 2, bent in such a manner that their rear rims are receding inwardly, so that the ledges are not presenting any substantial resistance during traveling to the air entrance into the slot. At the same time said grid consisting of ledges 6 contributes to a smooth external shape of the streamlined vehicle body, which is essential not only for the appearance of the vehicle but also for securing the full efficiency of the body space.

It is to be understood that the rims of said grid by being polished and chromeplated or the like can moreover improve the vehicle appearance in a substantial manner.

I claim:

1. In the air cooling of motor vehicles having a streamline body with the engine at the rear, a rear engine compartment in said streamline body, a grid structure covering a slot extending transversely the entire width of the vehicle body above said engine compartment to admit cooling air thereinto, said grid structure comprising a plurality of parallel ribs extending lengthwise of the vehicle body and a plurality of parallel bars extending transversely of the vehicle body, said bars consisting of sheet metal strips secured to said rib, said strips being bent with their rear edges directed inwardly so as to reduce their resistance to the entrance of air through said slot and into said engine compartment.

2. In the air cooling of motor vehicles having a streamline body with the engine at the rear, a rear engine compartment in said streamline body, a grid structure covering a slot extending transversely the entire width of the vehicle body above said engine compartment and downwardly into both side walls of the vehicle body to admit cooling air thereinto, said grid structure comprising a plurality of parallel ribs extending lengthwise of the vehicle body and a plurality of parallel bars extending transversely of the vehicle body, said bars consisting of sheet metal strips secured to said ribs, said strips being bent with their rear edges directed inwardly so as to reduce their resistance to the entrance of air through said slot and into said engine compartment.

RUDOLF BŘEŽEK.

REFERENCES CITED

The following references are of record in the file of this patent:

UNITED STATES PATENTS

| Number | Name | Date |
|---|---|---|
| 2,199,316 | Klavik | Apr. 30, 1940 |

FOREIGN PATENTS

| Number | Country | Date |
|---|---|---|
| 323,099 | Italy | Dec. 6, 1934 |
| 61,026 | Denmark | June 15, 1943 |